United States Patent [19]

Sander

[11] 3,959,661
[45] May 25, 1976

[54] APPARATUS FOR PURIFYING EXHAUST GASES CONTAINING IONIZABLE AND OXIDIZABLE COMPONENTS

[76] Inventor: Conrad Sander, Altdorfer Strasse, D 7441 Grossbettlingen, Germany

[22] Filed: Dec. 3, 1974

[21] Appl. No.: 529,226

[30] Foreign Application Priority Data
Dec. 5, 1973 Germany............................ 2360483

[52] U.S. Cl................................ 250/531; 250/533; 250/535; 204/164; 204/165; 204/168
[51] Int. Cl.²...................... B01K 1/00; C01B 13/11
[58] Field of Search.... 250/531, 533, 535, 542–547; 204/164, 165, 168; 60/275

[56] References Cited
UNITED STATES PATENTS

| 2,921,892 | 1/1960 | Casey.................................. 204/164 |
| 3,450,617 | 6/1969 | Hellund .............................. 204/164 |
| 3,562,128 | 2/1971 | Coffey ............................ 204/164 X |
| 3,600,126 | 8/1971 | Hellund .......................... 250/531 X |
| 3,607,085 | 9/1971 | Fusco.............................. 250/531 X |
| 3,655,244 | 5/1972 | Kugler ............................ 204/164 X |
| 3,706,182 | 12/1972 | Sargent.......................... 250/531 X |
| 3,745,104 | 7/1973 | Hou .................................... 204/164 |
| 3,745,751 | 7/1973 | Zey et al............................... 55/122 |
| 3,755,120 | 8/1973 | Kinser................................. 204/164 |
| 3,843,882 | 10/1974 | Presnetsov.......................... 250/536 |

Primary Examiner—John H. Mack
Assistant Examiner—Aaron Weisstuch
Attorney, Agent, or Firm—Roylance, Abrams, Berdo & Kaul

[57] ABSTRACT

Apparatus for purifying exhaust gases having ionizable and oxidizable gaseous components including an exhaust chamber having the exhaust gases flowing therethrough, a particle filter mounted in the chamber, a plurality of spaced electrodes located in the chamber downstream of the filter, and a power supply for providing a rectangularly-shaped AC voltage to the electrodes between which the exhaust gases flow.

6 Claims, 2 Drawing Figures

APPARATUS FOR PURIFYING EXHAUST GASES CONTAINING IONIZABLE AND OXIDIZABLE COMPONENTS

This invention relates to an apparatus for purifying exhaust gases containing ionizable and oxidizable gases, for example gaseous hydrocarbons, by passing the exhaust gases through an ionizing device having electrodes therein for the production of nascent oxygen and ozone.

In the prior art it is known to use ozone for the purification of ionizable and oxidizable gases, whereby ozone is admixed with exhaust gases. In this case, use is made of the strong oxidation effect of the ozone.

Ionizing devices for the production of such ozone have also been used in which quiet and cold electric discharges occur under high electrical voltages; however, these devices must be cooled during operation. Additionally, such devices have in the past been unduly complicated and costly.

The object of the present invention is to provide a simple device which is not costly to manufacture and which operates to purify exhaust gases containing ionizable and oxidizable component gases with a simple conduction of the gases and without the use of additional arrangements for the removal of these component gases from the exhaust gases.

According to the invention, an ionizer is used through which exhaust gases flow and which is fed with a rectangularly-shaped AC voltage for the purification of the exhaust gases containing ionizable and oxidizable components by combining these ionized gases with nascent oxygen and ozone produced by the electrodes in the ionizer.

A filter precedes the ionizer which produces ozone to prevent contamination of the ozone.

In the case of prior art ionizers used for the purification of exhaust gases, it has been found that the ionizer is operable only for a short time, for example, for 5 minutes, because of condensation deposits on the electrodes. This temporal limitation of operability of the ionizer has been eliminated surprisingly through feeding the ionizer with a rectangularly-shaped AC voltage.

In the case of an ionizer having planar electrodes, an electrode spacing of 5 to 15 mm., preferably 8 mm., has been found to be advantageous in combination with a voltage of 7 to 20 kilovolts, preferably 15 kilovolts. In the case of too small spacing of the electrodes, there is the danger of an electric flashover. And since the required voltage for purifying the exhaust gases increases as the square of the distance between the electrodes, with a large spacing of the electrodes a high voltage is required. The selection of a small spacing is also opposed by imprecision of the shape of the electrodes. The more regular and precise the surfaces of the electrodes, the higher are the costs of their production.

It has also been found that an optimum purification of the exhaust gases is achieved whenever the ratio of the effective length of the ionizer to the speed of the exhaust gases that are to be purified and flow through the ionizer, is dimensioned such that the delay time of the exhaust gases in the effective part of the ionizer amounts to at least about 0.1 seconds. This minimum delay time is advantageous to let the oxygen, which is present in the nascent state and as ozone, become effective in a sufficient manner with regard to the ionizable and oxidizable gases contained in the exhaust gases.

Other objects, advantages and salient features of the present invention will become apparent from the following detailed description, which, taken in conjunction with the annexed drawings, discloses a preferred embodiment of the present invention.

Referring now to the drawings which form a part of this original disclosure:

Figure 1:
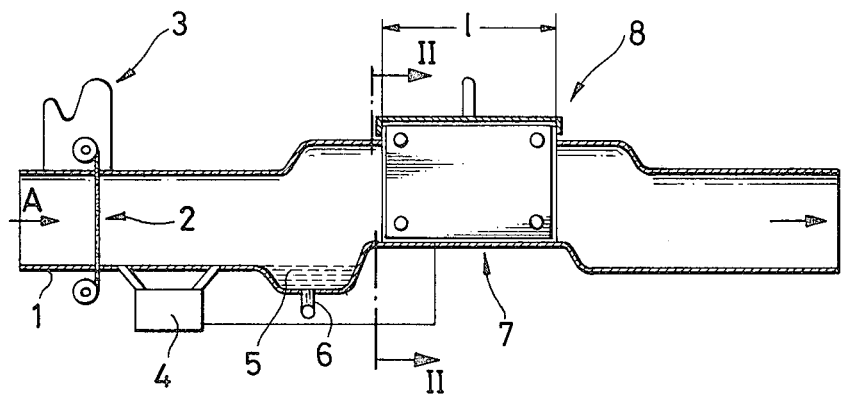
FIG. 1 shows a longitudinal cross-sectional view of the present invention.
Figure 2:
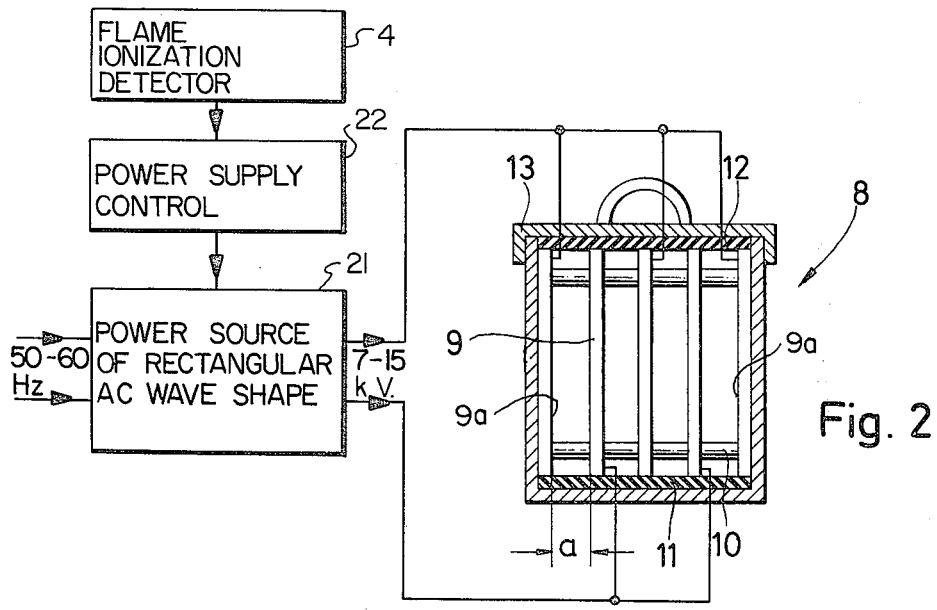
FIG. 2 shows a sectional view taken along line II—II in FIG. 1 on a larger scale, and a schematic diagram of the electrical circuitry coupled to the ionizer 8.

Referring now to the drawings in further detail, an exhaust pipe 1 is connected with the exhaust gases exiting from a container (not shown) in which, for example, paint is being sprayed, i.e., a container for painting bodies of automobiles by spraying on of paints. The direction of flow of the exhaust gases is designated by arrow A. In the exhaust pipe 1 a filter 2 is provided, which serves to eliminate dustlike and solid particles in the exhaust gases. The filter 2 preferably is developed as a movable filter, the filter web of which is wound on two superposed rolls and in which the spent filter web is shifted depending on the pressure differential measured by means of a measuring instrument 3 upstream and downstream of the filter 2, so that the soiled part of the filter web will be replaced if necessary by a new part.

A flame ionization detector 4 is connected with the exhaust gases pipe 1 downstream of the filter 2, which detector serves for measuring the concentration of ionizable and oxidizable gaseous hydrocarbons in the exhaust gases. Then follows a sump for the liquid 5 in the exhaust pipe 1, which has an outlet 6, which can be closed by means of a valve. The opening and closing of the valve can be controlled automatically depending on the level of the liquid in the sump. The liquid sump serves for the accommodation of condensates and of moisture carried along in the exhaust gases.

In a portion 7 transversely displaced from the longitudinal axis of the pipe 1, an ionizer 8 is provided. The ionizer has plate-shaped electrodes 9 with planar surfaces, which are disposed in parallel at a spacing $a = 8$ mm. and which have a length 1. The spacing of the electrodes can amount to between 5 to 15 mm. For the ionization of a certain quantity of exhaust gas the voltage necessary will be larger the further the electrodes 9 are spaced from one another. The electrodes consist of an aluminum alloy, of high-grade steel, or of a glass plate coated with a conductive layer. Between the electrodes there are spacers 10 made of glass or ceramic material which can be glued together with the electrodes 9. It is also possible to hold together a packet of electrodes 9 by means of an insulated tie-bar. The outside electrodes 9a are disposed in such a way that they fit against the pipe 1 which consists of an electrically conductive material. Insulating layers 11 and 12 are provided above and below the electrodes 9.

The displaced, or elevated, portion 7 of the pipe 1 is closed by a removable lid 13, so that the electrodes 9 are accessible and removable. The electrodes 9 and the insulating layer 12 can be attached to the lid 13, so that on removal of the lid 13, the electrodes 9 can be taken out, for example, for cleaning and servicing from the displaced portion of the exhaust pipe 1. In order to prevent accidents, a switch can be provided between the lid 13 and the displaced portion 7 of the exhaust pipe 1, which switch upon lifting off of the lid will separate the electrodes 9 from their source of power. Instead of electrodes having planar surfaces, pipe-shaped electrodes can be provided.

The length 1 of the ionizer is selected such that the delay time of the exhaust gases that are to be purified amounts to at least about 0.1 seconds in the ionizer 8.

For the operation of the ionizer 8, a rectangularly shaped AC voltage is provided to the electrodes by the source of power 21. The voltage preferably is between 7 and 15 kilovolts.

It can also be selected above that, which however is accompanied by greater difficulties of insulation. The frequency correspondes to the grid frequency of 50–60 Hz. The frequency can be selected at will in an area in which essentially too high capacitive losses do not occur, as for example in the case of high frequencies.

The gases passing through the spaces between the electrodes are ionized by glow-discharge therefrom. Since the ionized gases are not stable, they will combine with oxygen which is present in the form of nascent oxygen and ozone, and thereby be purified. The required quantity of power among other things depends on the type of ionizable or oxidizable gas. The power requirement drops with the growing molecular weight of the gas that is to be purified. The power consumption amounts, for example, to 1.1 kwh for the oxidation of 1 kg. solvent with a molecular weight of 100. For the production of 1 kg. of ozone, 16 to 19 kwh are required. Naturally the absolute content of ionizable and oxidizable gases, especially solvents, in the exhaust gases that are to be purified determines the power requirement. This content is measured by the flame ionization detector 4 and varies the power supplied to the ionizer by means of a control device 22. The flame ionization detector 4 can also be used downstream of the ionizer 8, whenever it is desired that the residual content of hydrocarbons serves for the control of regulation of the power supply.

The exhaust air pipe 1, viewed in the direction of flow of the exhaust gases, is again somewhat displaced downward behind the ionizer 8 in order to prevent any condensation products that might possibly have developed, from reaching the ionizer 8.

With the help of the apparatus according to the invention, exhaust gases having ionizable and oxidizable gaseous components can be purified in a manner conducive to and beneficial for the environment. In this case, no crack products develop, that is components of carbon compounds oxidized to $CO_2$. Also no nitric oxides occur. The ionizer 8 does not need to be cooled and the reaction can take place quicker with higher temperatures of the exhaust gases.

While one advantageous embodiment has been chosen to illustrate the invention, it will be understood by those skilled in the art that various changes and modifications can be made therein without departing from the scope of the invention as defined in the appended claims.

What is claimed is:

1. An apparatus for purifying exhaust gases having ionizable and oxidizable gaseous components, comprising:
    an exhaust chamber for flowing the exhaust gases therethrough, said exhaust chamber having a portion displaced transversely from the longitudinal axis of said chamber;
    a filter mounted across the inside of said exhaust chamber to remove particles from the exhaust gases;
    a plurality of spaced, parallel plate-shaped electrodes located in said displaced portion of said exhaust chamber downstream of said filter; and
    power means connected to each of said electrodes for providing a rectangularly-shaped AC voltage to alternate said electrodes to ionize and oxidize the gaseous components of the exhaust gases.

2. An apparatus according to claim 1, wherein
    said electrodes have planar surfaces,
    said voltage is in the range of 7 to 20 KV, and
    said electrodes are spaced apart a distance in the range of 5 to 15 mm.

3. An apparatus according to claim 2, wherein
    said voltage is 15 KV, and
    said electrodes are spaced apart a distance of 8 mm.

4. An apparatus for purifying exhaust gases having ionizable and oxidizable gaseous components, comprising:
    an exhaust chamber for flowing the exhaust gases therethrough;
    a filter mounted across the inside of said exhaust chamber to remove particles from the exhaust gases;
    a plurality of spaced, parallel electrodes located in said exhaust chamber downstream of said filter;
    said exhaust chamber having a portion displaced transversely from the longitudinal axis of said chamber, said portion containing said electrodes therein;
    power means for providing a rectangularly shaped AC voltage to said electrodes to ionize and oxidize the gaseous components of the exhaust gases; and
    a sump located adjacent and upstream of said portion.

5. An apparatus for purifying exhaust gases having ionizable and oxidizable gaseous components, comprising:
    an exhaust chamber for flowing the exhaust gases therethrough;
    a filter mounted across the inside of said exhaust chamber to remove particles from the exhaust gases;
    a plurality of spaced, parallel electrodes located in said exhaust chamber downstream of said filter;
    power means for providing a rectangularly shaped AC voltage to said electrodes to ionize and oxidize the gaseous components of the exhaust gases; and
    means for varying the voltage provided by said power means in response to the concentration of ionizable and oxidizable gaseous components in said exhaust chamber downstream of said filter.

6. An apparatus for purifying exhaust gases having ionizable and oxidizable gaseous components, comprising:
    an exhaust chamber for flowing the exhaust gases therethrough;
    a filter mounted across the inside of said exhaust chamber to remove particles from the exhaust gases;
    a plurality of spaced, parallel electrodes located in said exhaust chamber downstream of said filter;
    power means for providing a rectangularly shaped AC voltage to alternate ones of said electrodes to ionize and oxidize the gaseous components of the exhaust gases; and means between said filter and said electrodes for removing liquid from the exhaust gases flowing through said chamber.

* * * * *